Dec. 7, 1954
R. KAISER
2,696,394
SHEET METAL HOSE FITTING AND
METHOD OF MAKING THE SAME
Filed June 23, 1950
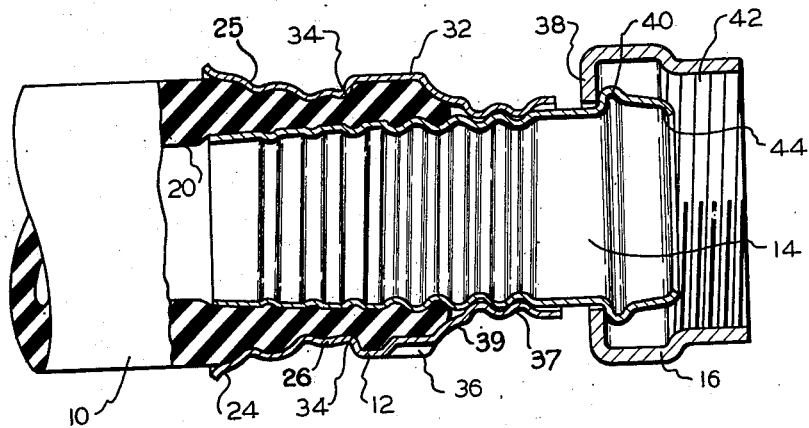
FIG. I.
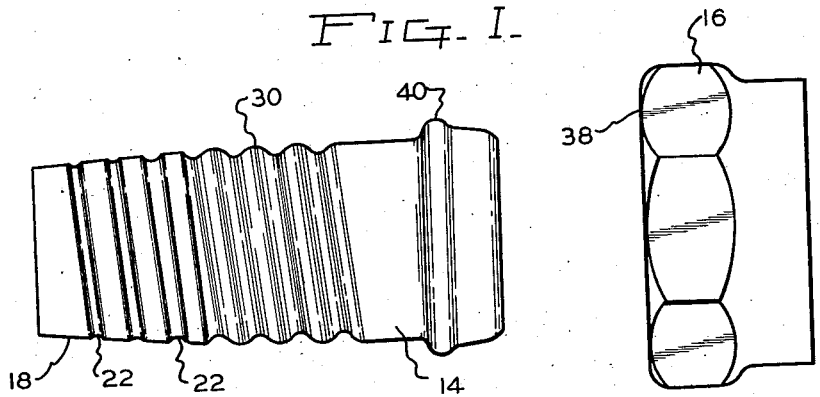
FIG. II.
FIG. IV.
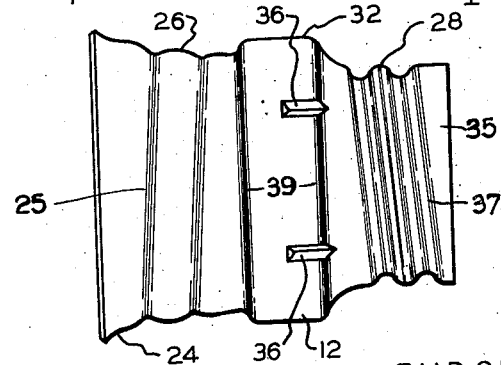
FIG. III.
INVENTOR
RUDOLF KAISER
BY *Townsend F. Beaman*
ATTORNEY 2,696,394

Patented Dec. 7, 1954

2,696,394

SHEET METAL HOSE FITTING AND METHOD OF MAKING THE SAME

Rudolf Kaiser, Ettlingen, Baden, Germany, assignor to Aeroquip Corporation, Jackson, Mich., a corporation of Michigan Application June 23, 1950, Serial No. 169,896

1 Claim. (Cl. 285—86)

The present invention relates to improvements in the manufacture of hose fittings.

In the past it has been the practice to fabricate the essential elements of hose fittings from bar stock by turning, drilling and threading operations. This method results in considerable waste of material and time. Also, when light metals are used for fabrication, the design is limited to certain minimum wall thickness.

According to the present invention the nipple, socket and nut of the hose fittings may be made from tube or flat stock by a series of drawing, rolling and stamping operations. In this manner, there is less wastage, a considerable saving in the time of manufacture, wall thicknesses can be reduced and cheaper material utilized.

Thus, an object of the invention is to provide hose fitting elements from tubular and flat stock characterized by having walls of substantially uniform section throughout as may be obtained by drawing, rolling and stamping operations.

Another object is to provide a hose fitting comprising a nipple, socket and nut all of thin wall tubular construction and fabricated from either tube stock or flat stock drawn into tubular form.

A further object is to provide a sheet metal hose fitting.

A still further object is to provide a detachable, reuseable nipple and socket assembly of sheet-like material for hose fittings.

These and other objects and advantages of the invention will appear from the following specification and claim.

In the drawings:

Fig. I is an elevational view of a hose and fitting assembly partly shown in section, Fig. II is an elevational view of the nipple, Fig. III is an elevational view of the socket, and Fig. IV is an elevational view of the nut.

In the drawings, in Fig. I is shown a hose 10 having assembled upon one end a detachable, reuseable fitting comprising a socket 12, a nipple 14, and a nut 16. It will be noted that the fitting elements are shown of substantially uniform material thickness throughout as is possible by fabricating the same from tubular or drawn sheet metal stock followed by rolling, forming and drawing operations.

The nipple 14 has a slightly tapered main body portion which assists the insertion of the nose portion 18 into the bore 20 of the hose 10. As shown, the nose portion 18 has a relatively smooth exterior surface except for the rather slightly rolled in spiral groove 22 which also assists in the insertion of the nipple 14 into the bore 20 upon the employment of relative rotation between the parts.

In practice, the socket 12 is first inserted over the end of the hose 10. To assist this operation, the skirt portion 24 is slightly flared outwardly from the portion 26 formed as a thread of opposite hand from the formed thread portion 28 in which the thread portion 30 of the nipple 14 operates. Between the thread portions 26 and 28 is an outwardly formed portion 32 which defines a recess on the interior terminating with a rather abrupt shoulder 34 at which point relatively high compressive forces are exerted upon the hose 10 by the process of screwing the nipple 14 into the socket 12. To hold the socket 12 against turning while the nipple is being screwed into or out of the socket 12 and bore 20, circumferentially spaced depressions 36 are provided to receive the teeth of a suitable holding tool.

The nut 16 is shown as a stamping having an opening defining flange 38 which engages back of the outwardly formed shoulder 40 on the nipple 14. The nut 16 is tapped at 42 to draw the seating end 44 of the nipple 14 against the sealing abutment to be provided by the threaded male part to be engaged by the nut 16.

The sheet metal socket has the outwardly flared skirt portion 24 at one end followed by the cylindrical portion 26, both shaped to define a spiral thread groove 26. The other end of the socket is of substantially less diameter than the said skirt portion and is formed by a cylindrical portion 35 having a spiral groove 37 of opposite hand to the spiral groove 25. This cylindrical socket end portion 35 is longitudinally spaced from said skirt and cylindrical portions 24, 26 by the intermediate portion 32 which is formed outwardly from the inner edge of the spirally threaded cylindrical portion 35 to form an interior recess having a cylindrical wall 39 (Fig. III) portion of substantial longitudinal extent and terminating in an abutment wall 41 connecting one end of the cylindrical portion of said recess and the inner edge of said helically threaded end portion 35, said abutment wall 41 being engaged by the end of the inserted hose, as seen in Figure I.

A fitting constructed as above described may be inexpensively fabricated from high tensile material such as steel yet be of light weight construction. It makes practical the use of high tensile non-corrosive materials. Also, the minimum bore of the nipple 14 may correspond to that of the bore 20 without sacrificing ease of assembly or unduly reducing the structural strength of the nose portion 18.

To assemble the fitting upon the hose 10, the hose end is inserted into the flared end portion 24 and relative rotation between the hose and socket is provided in a direction enabling the thread 26 to assist in drawing the hose into the socket to bring the end of the hose 10 well within the interior recess defined by portion 32. The nipple 14, with the nut 16 in position, is then inserted into the bore 20 and forced inwardly by a rotational movement until engagement takes place between the thread portions 28 and 30. Continued relative rotation between the nipple 14 and socket 12, will build up adequate compression forces upon the hose between the advance tapped wall of the nipple 14 and the shoulder 34 to seal the fitting upon the end of the hose.

The complete absence of sharp and jagged corners and shoulders due to the employment of forming and rolling operations, permits assembly and disassembly of the fitting elements with a minimum of abrasion of the hose structure.

Having thus described my invention what I claim as new and desire to protect by Letters Patent is:

A detachable reuseable hose fitting for a hose end comprising a socket of sheet metal of uniform wall thickness throughout the entire longitudinal length thereof, said socket having an outwardly flared skirt portion at one end followed by a cylindrical portion, said skirt and cylindrical portion having the wall thereof shaped to define a spiral thread groove, the other end of said socket being of substantially less diameter than said skirt portion and being longitudinally spaced therefrom by an intermediate portion of said socket and being substantially cylindrical with the wall thereof defining a helical thread groove of opposite hand to said spiral thread groove, the intermediate portion of said socket being formed outwardly from the inner edge of said spirally threaded cylindrical portion to form an interior recess having a cylindrical wall portion of substantial longitudinal extent and terminating in an abutment wall connecting one end of the cylindrical portion of said recess and the inner edge of said helically threaded cylindrical end portion, said abutment wall being engaged by the end of the inserted hose, a nipple for insertion into the bore of the hose end, said nipple having a tapered forward end and a cylindrical intermediate portion with a helical thread defined on the exterior surface thereof, said thread of said nipple, with said socket and nipple assembled upon a hose end, engaging with said helical groove of said socket in the cylindrical end of the socket remote from said skirt portion, said inner edge of said spirally threaded cylindrical socket portion adjacent said recess constituting an annular shoulder concentric with the tapered end of said nipple to provide an annular zone of maximum compression exerted upon the hose during the assembly of said nipple and socket.

References Cited in the file of this patent

UNITED STATES PATENTS

| Number | Name | Date |
|---|---|---|
| 810,155 | Klauer | Jan. 16, 1906 |
| 1,143,020 | Bailey | June 15, 1915 |
| 1,271,070 | Palecheck | July 2, 1918 |
| 1,517,553 | Fraser | Dec. 2, 1924 |
| 2,208,706 | Spencer | July 23, 1940 |
| 2,319,024 | Wehringer | May 11, 1943 |
| 2,333,350 | Weatherhead | Nov. 2, 1943 |
| 2,360,761 | Clickner | Oct. 17, 1944 |
| 2,374,224 | Melsom | Apr. 24, 1945 |

FOREIGN PATENTS

| Number | Country | Date |
|---|---|---|
| 10,641 | Great Britain | June 23, 1891 |